US011040727B2

(12) United States Patent
Shirakawa et al.

(10) Patent No.: US 11,040,727 B2
(45) Date of Patent: Jun. 22, 2021

(54) VEHICULAR ENGINE SPEED DISPLAY CONTROL DEVICE

(71) Applicant: TOYOTA JIDOSHA KABUSHIKI KAISHA, Toyota (JP)

(72) Inventors: Takanori Shirakawa, Gamagori (JP); Chikashi Ohta, Toyota (JP); Ryuta Kinoshita, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 242 days.

(21) Appl. No.: 16/416,324

(22) Filed: May 20, 2019

(65) Prior Publication Data

US 2019/0351917 A1   Nov. 21, 2019

(30) Foreign Application Priority Data

May 18, 2018  (JP) .............................. JP2018-096650

(51) Int. Cl.
*B60W 50/14* (2020.01)
*B60W 30/04* (2006.01)
*B60W 30/18* (2012.01)
*F16H 59/02* (2006.01)
*B60W 10/04* (2006.01)

(52) U.S. Cl.
CPC ............ *B60W 50/14* (2013.01); *B60W 10/04* (2013.01); *B60W 30/18009* (2013.01); *F16H 59/02* (2013.01)

(58) Field of Classification Search
None
See application file for complete search history.

(56) References Cited

U.S. PATENT DOCUMENTS

| 10,131,230 B2* | 11/2018 | Tanizoe ................ B60K 35/00 |
| 2005/0280521 A1* | 12/2005 | Mizumaki ............ B60K 35/00 340/438 |
| 2008/0023253 A1* | 1/2008 | Prost-Fin ........... B60N 2/42763 180/400 |
| 2008/0042821 A1* | 2/2008 | Kaya ..................... B60K 35/00 340/459 |

(Continued)

FOREIGN PATENT DOCUMENTS

| CN | 107956865 A | * 4/2018 | ........... B60W 50/14 |
| JP | 2010-271134 A | 12/2010 | |
| JP | 2016-060460 A | 4/2016 | |

*Primary Examiner* — Abdhesh K Jha
(74) *Attorney, Agent, or Firm* — Oliff PLC

(57) ABSTRACT

In an engine speed display control device of a vehicle including an engine speed display to display a determined display value of the engine speed, the engine speed display control device determines the display value of the engine speed, and includes a variation restricting display control portion configured to implement a variation restricting display control when a garage-parking shifting operation of the transmission shifting member is performed while the vehicle is held stationary in a non-operated position of the accelerator pedal. The variation restricting display control portion determines the display value of the engine speed in the variation restricting display control such that an amount of variation of the display value is smaller than in a normal display control in which the display value is determined according to the actual value.

7 Claims, 10 Drawing Sheets

(56) References Cited

U.S. PATENT DOCUMENTS

| | | | |
|---|---|---|---|
| 2008/0258892 A1* | 10/2008 | Itoh | G01D 7/002 340/441 |
| 2013/0002418 A1* | 1/2013 | Nakamura | B62J 50/22 340/441 |
| 2015/0175004 A1* | 6/2015 | Yasunaga | B60K 35/00 340/441 |
| 2016/0084866 A1 | 3/2016 | Teratani et al. | |
| 2016/0138468 A1* | 5/2016 | Shibata | G01P 1/07 701/110 |
| 2017/0045009 A1* | 2/2017 | Ueda | B60R 1/00 |
| 2017/0120750 A1* | 5/2017 | Romani | B60W 50/0097 |
| 2017/0268961 A1* | 9/2017 | Teratani | G01P 1/10 |
| 2018/0057001 A1* | 3/2018 | Hu | B60W 10/11 |
| 2020/0398814 A1* | 12/2020 | Higuchi | B60W 20/00 |

* cited by examiner

| SHIFT LEVER POSITION | OPERATING POSITIONS | C1 | C2 | C3 | C4 | B1 | B2 |
|---|---|---|---|---|---|---|---|
| D | 1st | O | | | | | O |
| | 2nd | O | | | | O | |
| | 3rd | O | | O | | | |
| | 4th | O | | | O | | |
| | 5th | O | O | | | | |
| | 6th | | O | | O | | |
| | 7th | | O | O | | | |
| | 8th | | O | | | O | |
| R | Rev | | | O | | | O |
| N | N | | | | | | |

(O: ENGAGED)

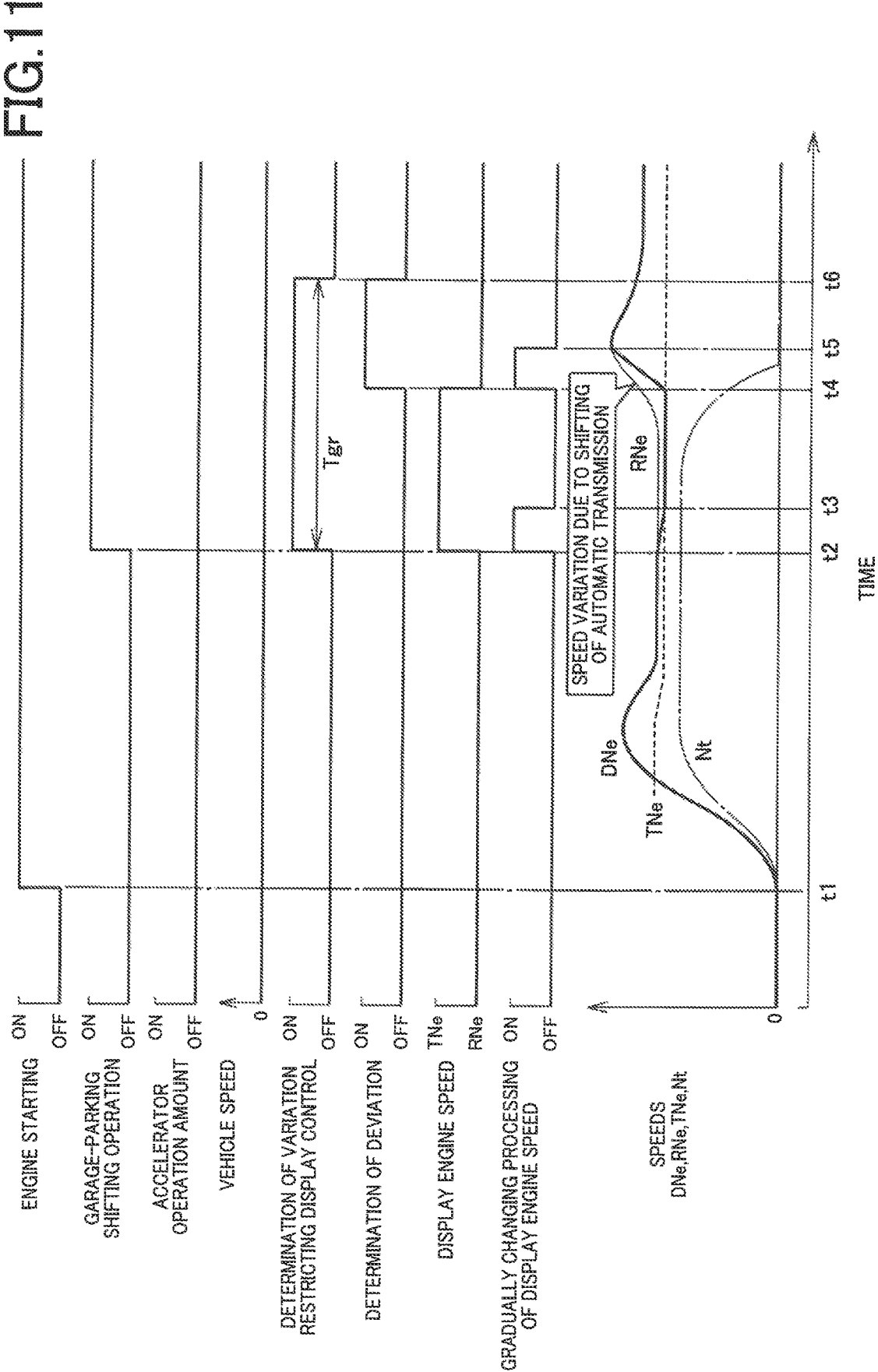

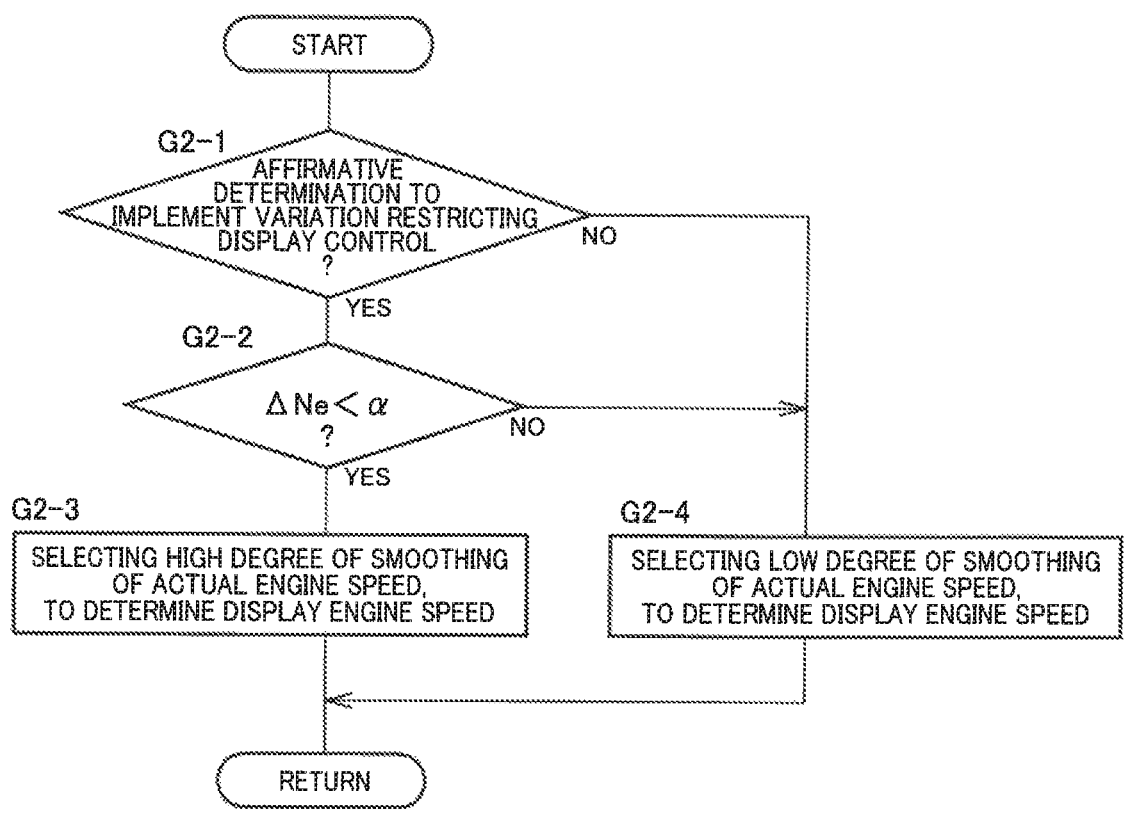

VEHICULAR ENGINE SPEED DISPLAY CONTROL DEVICE

This application claims priority from Japanese Patent Application No. 2018-096650 filed on May 18, 2018, the disclosure of which is herein incorporated by reference in its entirety.

FIELD OF THE INVENTION

The present invention relates generally to a vehicular engine speed display control device, and more particularly to a control of display of an operating speed of an engine of a vehicle when a garage-parking shifting operation of a shift lever of the vehicle is performed.

BACKGROUND OF THE INVENTION

There is known an engine speed display control device of a vehicle comprising: a vehicular drive system including an engine, a fluid-operated power transmitting device, and an automatic transmission having a plurality of operating positions having respective different states of transmission of power therethrough; a manually operated transmission shifting member operated by an operator of the vehicle to place the automatic transmission in a selected one of the operating positions; an engine speed sensor to detect an actual value of an operating speed of the engine; and an engine speed display to display a controlled value of the operating speed of the engine. The engine speed display control device is configured such that the actual value of the operating speed of the engine is normally displayed as the controlled value of the engine operating speed. JP2016-60460A discloses an example of the engine speed display control device. The engine speed display control device disclosed in this publication is configured to estimate the engine operating speed on the basis of an operating position of the automatic transmission to be established after a shifting action thereof, and to display the thus estimated value of the engine operating speed in the process of the shifting action of the automatic transmission. This engine speed display control device has an improved response to the shifting action of the automatic transmission.

By the way, a so-called "garage-parking" shifting operation of the manually operated transmission shifting member may be performed to shift the automatic transmission while the vehicle is stationary and while an accelerator pedal of the vehicle is held in its non-operated position with the operating amount of the accelerator pedal being zero. Even in this event, the engine is controlled to control its torque such that the operating speed coincides with a target value such as a predetermined engine idling value. Accordingly, the actual value of the engine operating speed is displayed as the controlled value. However, the shifting action of the automatic transmission in response to the garage-parking shifting operation of the manually operated transmission shifting member causes a change of power transmitting state in the automatic transmission, thus, a variation of a load acting on the engine, and a consequent variation of the actual engine speed and also a consequent variation of the controlled value of the engine speed, due to a low degree of response of a torque control of the engine by a feedback control, for instance. The vehicle operator may feel uneasy about this variation of the displayed engine speed. Although it is considered possible to control the engine torque so as to match the timing of the shifting action of the automatic transmission, in view of the torque control response of the engine, it is difficult to adequately reduce an amount of variation of the actual engine speed due to variations of the engine torque control response, a transmission shifting control response and the load acting on the engine, which take place due to variations of a cooling water temperature of the engine and a working fluid temperature of the automatic transmission, a variation of the viscosity of the working fluid, variations of slipping torque of clutches and brakes incorporated in the automatic transmission.

SUMMARY OF THE INVENTION

The present invention was made in view of the background art described above. It is therefore an object of the present invention to provide a vehicular engine speed display control device to control an engine speed display, which engine speed display control device has a reduced possibility of causing the vehicle operator to feel uneasy about a variation of the engine speed displayed on an engine speed display upon a garage-parking shifting operation of a manually operated transmission shifting member.

The object indicated above is achieved according to the following modes of the present invention:

According to a first mode of the invention, there is provided an engine speed display control device of a vehicle including: a vehicular drive system including an engine, a fluid-operated power transmitting device, and an automatic transmission having a plurality of operating positions having respective different states of transmission of power therethrough; a manually operated transmission shifting member operated by an operator of the vehicle to place the automatic transmission in a selected one of the operating positions; an accelerator pedal; an engine speed sensor to detect an actual value of an operating speed of the engine; and an engine speed display to display a determined display value of the operating speed of the engine, the engine speed display control device being configured to determine the display value of the operating speed of the engine to be displayed by the engine speed display, and comprising: a variation restricting display control portion configured to implement a variation restricting display control when a garage-parking shifting operation of the manually operated transmission shifting member is performed while the vehicle is held stationary and while the accelerator pedal is placed in the non-operated position, the variation restricting display control portion determining the display value of the operating speed of the engine in the variation restricting display control such that an amount of variation of the display value is smaller than in a normal display control in which the display value is determined according to the actual value.

According to a second mode of the invention, the variation restricting display control portion determines the display value of the operating speed of the engine according to a target value of the operating speed used in place of the actual value, in the variation restricting display control.

According to a third mode of the invention, the engine speed display control device according to the second mode of the invention is configured such that the variation restricting display control portion gradually changes the display value of the operating speed of the engine, during a period of transition between the normal display control and the variation restricting display control.

According to a fourth mode of the invention, the engine speed display control device according to the first mode of the invention is configured such that the variation restricting display control portion selects a higher degree of smoothing of the actual value of the operating speed of the engine to reduce an amount of variation of the display value in the variation restricting display control, than in the normal display control.

According to a fifth mode of the invention, the engine speed display control device according to any one of the first through fourth modes of the invention is configured such that the variation restricting display control portion does not implement the variation restricting display control to restrict the variation of the display value of the operating speed of the engine, when an amount of deviation of the actual value of the operating speed of the engine from a target value of the operating speed is equal to or larger than a predetermined threshold value.

According to a sixth mode of the invention, the engine speed display control device according to any one of the first through fifth modes of the invention is configured such that the variation restricting display control portion switches a display control mode from the variation restricting display control to restrict the variation of the display value of the operating speed of the engine, to the normal display control, when a predetermined variation restricting time has passed after a moment of the garage-parking shifting operation of the manually operated transmission shifting member is performed.

According to a seventh mode of the invention, the engine speed display control device according to any one of the first through sixth modes of the invention is configured such that the vehicle further includes an idling speed control portion configured to implement an idling speed variation restricting control to control a torque of the engine in synchronization with a shifting action of the automatic transmission in response to the garage-parking shifting operation of the manually operated transmission shifting member, and in consideration of a control response of the torque of the engine, so as to reduce an amount of deviation of the actual value of the operating speed of the engine from a target value of the operating speed during the shifting action of the automatic transmission so as to match the timing of the shifting action of the automatic transmission.

In the engine speed display control device according to the first mode of the invention, the variation restricting display control portion is configured to determine the display value of the operating speed of the engine in the variation restricting display control such that the amount of variation of the display value is smaller than in the normal display control in which the display value is determined according to the actual value when a garage-parking shifting operation is performed. Thus, the present engine speed display control device restricts the variation of the display engine speed, so that the vehicle operator is less likely to feel uneasy about the display engine speed, even when the actual engine speed varies, during a shifting action of the automatic transmission in response to the garage-parking shifting operation of the manually operated transmission shifting member, due to a variation of a load acting on the engine during the shifting action of the automatic transmission, and an inadequate timing of control between the shifting action and the engine torque.

According to the second mode of the invention wherein the engine speed display control device according to the first mode of the invention is configured to determine the display value of the operating speed of the engine according to the target value of the operating speed used in place of the actual value, in the variation restricting display control, the variation of the display value of the operating speed of the engine is adequately restricted in spite of the variation of the actual value, so that the vehicle operator is less likely to feel uneasy about the display value.

According to the third mode of the invention wherein the variation restricting display control portion gradually changes the display value of the operating speed of the engine during the period of transition between the normal display control and the variation restricting display control, the vehicle operator is less likely to feel uneasy about the display value of the operating speed of the engine the variation of which is reduced during the period of transition between the normal and variation restricting display controls.

According to the fourth mode of the invention wherein the variation restricting display control portion selects the higher degree of smoothing of the actual value of the operating speed of the engine to reduce the amount of variation of the display value in the variation restricting display control, than in the normal display control, a rate of change and an amount of change of the actual value of the engine speed are lower or smaller in the variation restricting display control, than in the normal display control, so that the vehicle operator is less likely to feel uneasy about the display value of the engine speed.

According to the fifth mode of the invention, the variation restricting display control portion does not implement the variation restricting display control to restrict the variation of the display value of the operating speed of the engine, and implements the normal display control to determine the display value of the engine speed according to the actual value, when the amount of deviation of the actual value of the operating speed of the engine from the target value of the operating speed is equal to or larger than the predetermined threshold value. Namely, if the variation restricting display control is implemented when the amount of deviation of the actual value of the engine speed from the target value is equal to or larger than the threshold value, there is a possibility that the vehicle operator feels uneasy about the display value of the engine speed the variation of which is restricted, since the vehicle operator feels a large difference of the display engine speed value from an engine speed value estimated by the vehicle operator on the basis of an operating sound of the engine. Accordingly, the normal display control is implemented to change the display engine speed value according to a variation of the actual engine speed value, so that the vehicle operator is less likely to feel uneasy about the difference of the display engine speed value from the engine speed value estimated by the vehicle operator on the basis of the operating sound of the engine.

According to the sixth mode of the invention wherein the variation restricting display control portion switches the display control mode to the normal display control when the predetermined variation restricting time has passed after the moment of the garage-parking shifting operation of the manually operated transmission shifting member is performed, the variation restricting display control is implemented to restrict the variation of the display engine speed value only during a time period during which there is a possibility of variation of the actual engine speed value due to the garage-parking shifting operation of the manually operated transmission shifting member. Accordingly, the present variation restricting display control portion makes it possible to reduce the possibility of the vehicle operator feeling uneasy about the variation of the display engine speed value, while minimizing a time period during which the display engine speed value deviates from the actual value.

According to the seventh mode of the invention, the idling speed variation restricting control is implemented to control the torque of the engine in synchronization with the shifting action of the automatic transmission in response to the garage-parking shifting operation of the manually operated transmission shifting member, and in consideration of a delayed control response of the torque of the engine, so as to reduce the amount of deviation of the actual engine speed value from the target value of the operating speed during the shifting action of the automatic transmission so as to match the timing of the shifting action of the automatic transmission. Normally, the variation of the actual engine speed value during the shifting action of the automatic transmission is restricted in response to the garage-parking shifting operation of the manually operated transmission shifting member. However, it is difficult to always adequately restrict the variation of the actual engine speed value, due to variations of control response of the engine torque and the shifting action of the automatic transmission, and variation of the engine load which are caused by variations of the temperatures of the cooling water of the engine and the working fluid of the automatic transmission, the viscosity of the working fluid, and slipping torques of clutches and brakes of the automatic transmission. Therefore, there is a possibility that the idling speed variation restricting control causes a considerable variation of the actual engine speed value, depending upon the state of the vehicle, for instance, immediately after starting of the engine. Accordingly, the variation restricting display control portion according to the seventh mode of the invention has an advantage of reducing the variation of the display engine speed value upon the garage-parking shifting operation, and the possibility of the vehicle operator feeling uneasy about the display engine speed value.

BRIEF DESCRIPTION OF THE DRAWINGS

FIG. 11 is a time chart indicating an example of changes of the operating states when an actual engine speed is abruptly raised as compared with FIG. 10 as a result of the garage-parking shifting operation of the shift lever; and FIG. 12 is a flow chart illustrating an operation of the variation restricting portion of FIG. 1, according to a second embodiment of this invention.

DETAILED DESCRIPTION OF A PREFERRED EMBODIMENT

Figure 1:
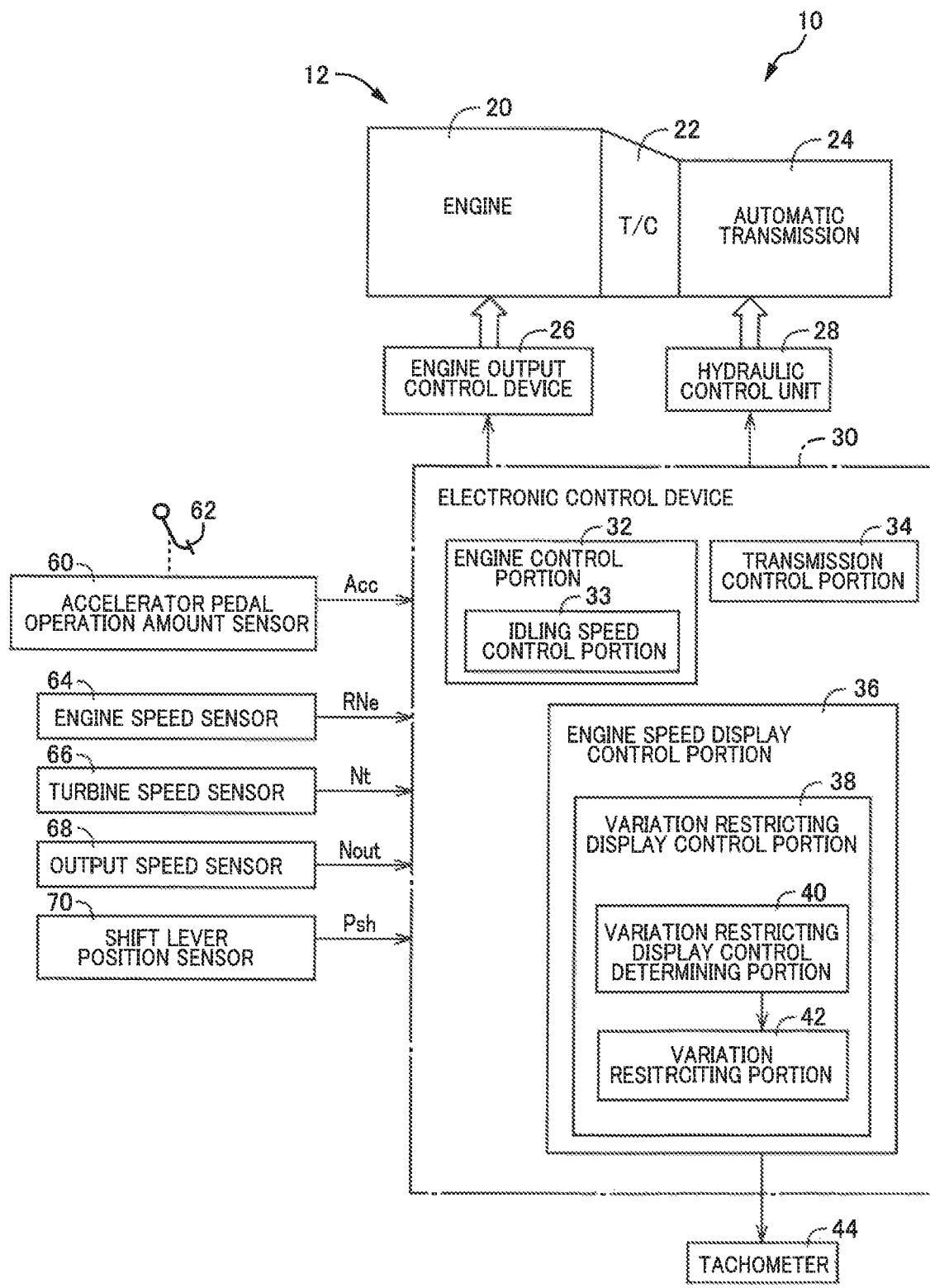
FIG. 1 is a schematic view showing an arrangement of a vehicle, and major portions of its control system provided with an engine speed display control device according to one embodiment of this invention.

The engine is used as a vehicle drive power source, and is an internal combustion engine such as a gasoline or diesel engine, which generates a drive force by combustion of a fuel. The present invention is also applicable to a hybrid vehicle provided with a drive power source including an electric motor or motors as well as the engine. Although a torque converter is preferably used as the fluid-operated power transmitting device, a fluid coupling or any other type of fluid-operated power transmitting device may be used. For example, the plurality of operating positions of the automatic transmission include at least two of: a forward-drive position D in which a forward drive force is transmittable; a reverse-drive position R in which a reverse drive force is transmittable; and a neutral position N (parking position P) in which a drive force is not transmittable. The automatic transmission may be selected from among various types such as: a step-variable automatic transmission of a planetary gear type or a 2-axes meshing type, which is provided with a plurality of frictional coupling devices which are selectively placed in engaged and released states, to establish the plurality of operating positions including forward-drive speed positions, a reverse-drive speed position and a neutral position; a forward/reverse switching type transmission; and a transmission which is a combination of a forward/reverse switching device, and a continuously variable transmission of a belt-and-pulley type, for example.

The engine speed display to display the display value of the operating speed of the engine may be of various types such as: an analog type display having an indicator panel in the form of a disc and an indicator needle fixed at its one end to a center shaft which is rotatable to rotate the indicator needle to point or indicate the display value of the engine speed; a digital type display to display a numerical value indicative of the display engine speed value; and a bar type display having an indicator bar a length of which is variable. The display engine speed value is determined according to the actual engine speed value or the target engine speed value. For example, the actual or target engine speed value is determined as the display engine speed value. Alternatively, the actual or target engine speed value is subjected to a smoothing or any other processing operation, to calculate or determine the display engine speed.

The garage-parking shifting operation of the manually operated transmission shifting member (herein also referred as shift lever) is an operation of the shift lever while the vehicle is held stationary and while the accelerator pedal is placed in the non-operated position. A determination as to whether the accelerator pedal is placed in the non-operated position may be made on the basis of an angle of opening of a throttle valve which is controlled according to an amount of operation of the accelerator pedal. The variation restricting display control of the display engine speed value may be implemented upon at least one of different shifting operations of the shift lever, such as a shifting operation from the neutral position to its forward-drive or reverse-drive position, a shifting operation from the forward-drive or reverse-drive position to the neutral position, and a shifting operation from the forward-drive position to the reverse-drive position or from the reverse-drive position to the forward-drive position. The variation restricting display control is implemented such that an amount of variation of the display engine speed value is smaller than in the normal display control in which the display engine speed value is determined by or according to the actual engine speed. For example, the variation restricting display control is formulated such that the display engine speed value is determined by or according to the target engine speed value, or by selecting a higher degree of smoothing of the actual engine speed than in the normal display control, to determine the display engine speed value on the basis of the thus smoothed actual engine speed value. Alternatively, the variation restricting display control is formulated such that the display engine speed value is limited within a predetermined range defined by upper and lower limits determined on the basis of the target engine speed value.

It is desirable to implement a processing for gradually changing the display engine speed value at a predetermined time interval, or at a predetermined rate of change, for example, upon transition of the display control mode from the normal display control to the variation restricting display control, or from the variation restricting display control back to the normal display control. However, the display control mode may be switched between the normal display control and the variation restricting display control, without the gradually changing processing of the display engine speed value. It is possible to inhibit the transition of the display control mode from the normal display control to the variation restricting display control as long as the amount of deviation of the actual engine speed value from the target engine speed value is larger than the predetermined threshold value. However, the display control mode may be switched from the normal display control to the variation restricting display control, irrespective of the amount of deviation of the actual engine speed value from the target engine speed value. The threshold value of the amount of deviation may be held constant, or may be variable according to the kind of the garage-parking shifting operation of the shift lever, or the state of the vehicle. The variation restricting display control portion is preferably configured to return the display control mode back to the normal display control, when a predetermined length of variation restricting time has passed after a moment of the garage-parking shifting operation of the shift lever. However, the variation restricting display control portion may be configured to continue the variation restricting display control until a predetermined condition for returning the display control mode back to the normal display control is satisfied, for instance, until the accelerator pedal is operated, or the vehicle is started. The variation restricting time, which is preferably determined to be as short as possible, includes at least a time length during which the actual engine speed value may vary due to the garage-parking shifting operation. For example, the variation restricting time is determined so as to change according to the kind of the garage-parking shifting operation and the state of the vehicle. However, the variation restricting time may be determined, irrespective of the kind of the garage-parking shifting operation and the state of the vehicle, to be a predetermined comparatively long time including the time length during which the actual engine speed value may vary.

The present invention is suitably applicable to the vehicle provided with the idling speed control portion configured to implement the idling speed variation restricting control for controlling the torque of the engine by a feed-forward control, for example, in synchronization with the shifting action of the automatic transmission, in consideration of the control response of the engine torque, so as to reduce the amount of deviation of the actual engine speed value from the target engine speed value during the shifting action of the automatic transmission as a result of the garage-parking shifting operation of the shift lever. In this case, the variation restricting display control portion may be configured to necessarily implement the variation restricting display control of the display engine speed value, when the garage-parking shifting operation of the shift lever is performed. However, the variation restricting display control portion may be alternatively configured to implement the variation restricting display control, only when the vehicle is placed in a state in which a control timing between the torque of the engine and the shifting action of the automatic transmission tends to be unstable, or in which the load acting on the engine tends to vary, for example, only when the temperature of the cooling water of the engine or the working fluid of the automatic transmission is low. Alternatively, the variation restricting display control portion may be configured to implement the variation restricting display control, only when the garage-parking shifting operation is performed for the first time after starting of the engine, or performed within a predetermined length of time after starting of the engine. Further, the present invention is equally applicable to the vehicle in which the engine torque is feedback-controlled such that the actual engine speed value coincides with the target value, irrespective of whether the garage-parking shifting operation of the shift lever is performed or not. The variation restricting display control according to the invention is also effective in this case, since the above-indicated control of the engine torque may cause a variation of the actual engine speed value due to a variation of the engine load as a result of the garage-parking shifting operation, where the control response of the engine torque is not sufficiently high.

EMBODIMENTS

Preferred embodiments of the present invention will be described in detail by reference to the drawings. Reference is first made to FIG. 1 which is the schematic view of a vehicle 10, and major portions of a control system provided with an engine speed display control device in the form of an engine speed display control portion 36 according to a first embodiment of this invention. The vehicle 10 is provided with a drive system 12 in which an engine 20, a torque converter (T/C) 22, and an automatic transmission 24 are connected in series with each other. For instance, the vehicle 10 is of an FR (front-engine rear-drive) type in which the drive system 12 is installed such that its axial direction is parallel to the longitudinal direction (running direction) of the vehicle 10. The engine 20 is a drive power source of the vehicle 10, which is an internal combustion engine such as a gasoline engine operable to generate a drive force by combustion of a fuel. Namely, the vehicle 10 is an engine-drive vehicle provided with only the engine 20 as the drive power source. The control system of the vehicle 10 includes an engine output control device 26 to control an output of the engine 20. The engine output control device 26 is provided with an electronic throttle valve, a fuel injecting device, and an igniting device, which are controlled according to control signals generated by an electronic control device 30, so that the output of the engine 20 is electrically controlled by the electronic control device 30.

Figures 2, 3:
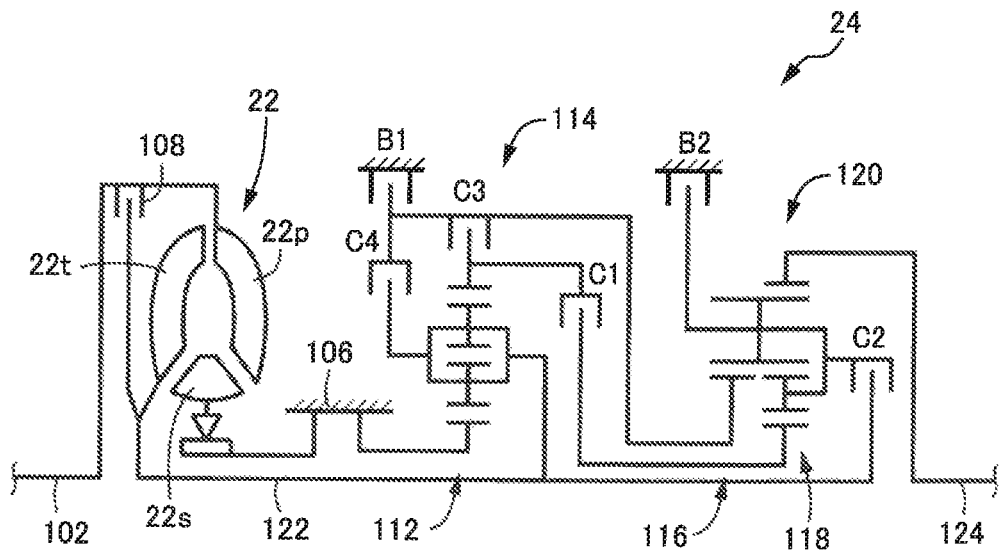
FIG. 2 is a schematic view showing an example of an automatic transmission shown in FIG. 1.
FIG. 3 is a table indicating a relationship between a plurality of gear positions of the automatic transmission of FIG. 2 and respective combinations of frictional coupling devices which are placed in engaged states to establish the gear positions.

FIG. 2 is the schematic view showing examples of the torque converter 22 and the automatic transmission 24. The torque converter 22 includes a pump impeller 22p connected to a crankshaft 102 of the engine 20, a turbine impeller 22t connected to an input shaft 122 of the automatic transmission 24, and a stator impeller 22s connected to a casing 106 of the automatic transmission 24 through a one-way clutch. The torque converter 22 is a fluid-operated power transmitting device for transmitting a drive force of the engine 20 to the automatic transmission 24 through a fluid. The drive system 12 further includes a direct coupling clutch in the form of a lock-up clutch 108 disposed between the pump impeller 22p and the turbine impeller 22t. This lock-up clutch 108 is electrically controlled so as to be selectively placed its engaged and released states, according to lock-up clutch control signals generated by the electronic control device 30 to control lock-up clutch control valves incorporated in a hydraulic control unit 28 indicated in FIG. 1.

The automatic transmission 24 is provided with a first shifting portion 114 consisting principally of a first planetary gear set 112 of a double-pinion type; and a second shifting portion 120 consisting principally of a second planetary gear set 116 of a single-pinion type and a third planetary gear set 118 of a double-pinion type. The first and second shifting portions 114 and 120 are disposed coaxially with each other. The automatic transmission 24 has the input shaft 122 and an output shaft 124, and is configured to transmit a rotary motion of the input shaft 122 to the output shaft 124 such that a speed ratio of the input shaft 122 with respect to the output shaft 124 is variable. The rotary motion of the output shaft 124 is transmitted to left and right drive wheels of the vehicle 10 through a final speed reducing device not shown. The second and third planetary gear sets 116 and 118 are Ravigneaux type planetary gear sets whose carriers are formed integrally with each other, and ring gears are also formed integrally and in which a pinion gear of the second planetary gear set 116 and a second or outer pinion gear of the third planetary gear set 118 are formed as a single member.

The automatic transmission 24 is provided with four clutches C1-C4 and two brakes B1 and B2 (hereinafter collectively referred to as "clutches C" and "brakes B", unless otherwise specified) as hydraulic frictional coupling devices, each of which is selectively placed in an engaged or released state, with AT solenoid operated valves of the hydraulic control unit 28 being electrically controlled according to shifting control signals generated from the electronic control device 30. The AT solenoid operated valves are provided for the respective clutches C1-C4 and brakes B1 and B2, so that each of these clutches C and brakes B is controlled to be selectively placed in the engaged or released state, independently of each other. As indicated in the table of FIG. 3, the automatic transmission 24 is placed in one of eight forward-drive speed positions "$1^{st}$" through "$8^{th}$" and a reverse-drive position "Rev", when a corresponding one of combinations of two of the clutches C and brakes B is placed in the engaged state, and is placed in a neutral position "N" when all of the clutches C and brakes B are placed in the released states. Namely, the automatic transmission 24 is selectively placed in a forward-drive state "D" for driving the vehicle 10 in the forward direction in one of the eight forward-drive speed positions "$1^{st}$" through "$8^{th}$", a reverse-drive state "R" for driving the vehicle 10 in the reverse direction in the reverse-drive position "Rev", or a neutral state "N" in which the vehicle 10 cannot be driven without power transmission through the automatic transmission 24. These forward-drive state "D", reverse-drive state "R" and neutral state "N" are different states of transmission of power through the automatic transmission 24. It is noted that each of the automatic transmission 24 and the torque converter 22 is constructed substantially symmetrically about axis of the automatic transmission 24 and the torque converter 22, respectively, and that lower half is not shown in the schematic view of FIG. 2.

The electronic control device 30 is provided as a controller for implementing various controls of the vehicle 10, such as an output control of the engine 20, a shift control of the automatic transmission 24, and an engaging/releasing control of the lock-up clutch 108. The electronic control device 30 is configured to receive output signals of various sensors necessary to implement the various controls, such as: an output signal of an accelerator pedal operation amount sensor 60 indicative of an operation amount Acc of an accelerator pedal 62; an output signal of an engine speed sensor 64 indicative of an actual operating speed RNe of the engine 20 (actual engine speed RNe); an output signal of a turbine speed sensor 66 indicative of a turbine speed Nt represented by a rotating speed of the input shaft 122; an output signal of an output speed sensor 68 indicative of an output speed Nout represented by a rotating speed of the output shaft 124; and an output signal of a shift lever position sensor 70 indicative of a shift lever position Psh which is a presently selected operating position of a shift lever 72 (shown in FIG. 4). It is noted that the accelerator pedal 62 functions as a manually operated vehicle accelerating member, while the output speed Nout corresponds to a running speed V of the vehicle 10.

Figure 4:
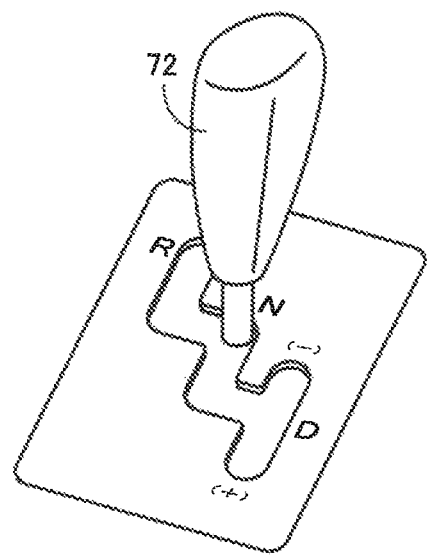
FIG. 4 is a perspective view showing an example of a shift lever provided on the vehicle of FIG. 1.

As shown in FIG. 4, the shift lever 72 is operable to a selected one of its three operating positions, namely, a neutral position N, a reverse-drive position R and a forward-drive position D. The shift lever 72 is operated to the neutral position N, reverse-drive position R and forward-drive position D for respectively establishing the neutral position N, the reverse-drive position Rev, and one of the forward-drive speed positions $1^{st}$ through $8^{th}$ of the automatic transmission 24. The automatic transmission 24 is electrically controlled according to an operation of the shift lever 72 to one of the neutral position N, reverse-drive position R and forward-drive speed positions $1^{st}$ through $8^{th}$, so as to be shifted to a corresponding one of the neutral position N, reverse-drive position Rev and the forward-drive speed positions $1^{st}$ through $8^{th}$, which are indicated in the table of FIG. 3. When the shift lever 72 is placed in the forward-drive position D while the vehicle 10 is held stationary, the automatic transmission 24 is placed in the first-speed forward-drive position $1^{st}$ having a highest speed ratio γ. In the forward-drive position D of the shift lever 72, the automatic transmission 24 is automatically shifted from the first-speed forward-drive position $1^{st}$ to a higher one of the forward-drive speed positions $2^{nd}$ through $8^{th}$ according to a change of a running state of the vehicle 10 as represented by the running speed V and the accelerator pedal operation amount Acc. The shift lever 72 is operable from the forward-drive position D to a shift-up position "+" and a shift-down position "−". The automatic transmission 24 can be manually shifted up and down by operating the shift lever 72 to the respective shift-up and shift-down positions "+" and "−". It is noted that the shift lever 72 functions as a manually operated transmission shifting member for shifting the automatic transmission 24.

The electronic control device 30 is principally constituted by a so-called microcomputer incorporating a CPU, a RAM, a ROM and an input/output interface, and operates to perform signal processing operations according to control programs stored in the ROM, while utilizing a temporary data storage function of the RAM. As shown in FIG. 1, the electronic control device 30 has three control functions, namely, includes an engine control portion 32, a transmission control portion 34 and the engine speed display control portion 36.

The engine control portion 32 is configured to basically control a torque Te of the engine 20 according to the accelerator pedal operation amount Acc. The engine control portion 32 includes an idling speed control portion 33 for controlling the engine 20 while the accelerator pedal operation amount Acc is equal to or smaller than zero (Acc≤0), that is, while the accelerator pedal 62 is held in its non-operated position. The idling speed control portion 33 is configured to basically feedback-control the engine torque Te such that the actual engine speed RNe coincides with a predetermined target value TNe while the accelerator pedal 62 is held in the non-operated position. The target value TNe is a target idling speed of the engine 20. For example, the target value TNe is changed according to an operating state of the engine 20 such as cooling water temperature. However, the target value TNe may be a constant value.

The transmission control portion 34 is provided to implement the shift control of the automatic transmission 24, more specifically, to control the clutches C1-C4 and the brakes B1 and B2 (indicated in the table of FIG. 3), and the lock-up clutch 108 (shown in FIG. 2). During forward running of the vehicle 10, the transmission control portion 34 controls the AT solenoid-operated valves of the hydraulic control unit 28 (shown in FIG. 1) for selectively placing the clutches C1-C4 and brakes B1 and B2 in the engaged or released states, so as to place the automatic transmission 24 in a selected one of the forward-drive speed positions $1^{st}$ through $8^{th}$, according to a predetermined shifting map. For instance, the shifting map is formulated to shift the automatic transmission 24 on the basis of the vehicle running speed V, and a required vehicle drive force as represented by the accelerator pedal operation amount Acc, such that the speed ratio γ of the automatic transmission 24 decreases with an increase of the vehicle running speed V, and increases with an increase of the required vehicle drive force, namely, such that the automatic transmission 24 is shifted up as the vehicle running speed V is raised, and shifted down as the required vehicle drive force is increased. The transmission control portion 34 is further configured to control lock-up clutch control valves of the hydraulic control unit 28 for selectively placing the lock-up clutch 108 in the engaged or released state, according to a predetermined lock-up clutch switching map.

Figure 5:
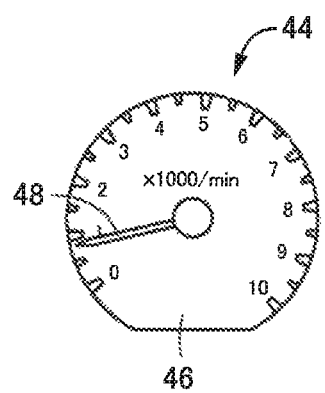
FIG. 5 is a view showing an example of a tachometer provided on the vehicle of FIG. 1.

The engine speed display control portion 36 is configured to control a display engine speed DNe, which is the operating speed Ne of the engine 20 to be displayed on a tachometer 44 (shown in FIGS. 1 and 5) disposed in front of a vehicle operator's seat in the vehicle 10. The engine speed display control portion 36 is basically configured to implement a normal display control for determining the display engine speed DNe on the basis of the actual engine speed RNe. The engine speed display control portion 36 may determine the actual engine speed RNe as the display engine speed DNe, or may calculate the display engine speed DNe by smoothing a change of the actual engine speed RNe, for instance. FIG. 5 shows an example of the tachometer 44, which is an analog display type speed indicator having an indicator 46 in the form of a circular disc, and an indicator needle 48 fixed at its one end to a center shaft which is rotatable to rotate the indicator needle 48 to point or indicate the display engine speed DNe. It is noted that the engine speed display control portion 36 functions as an engine speed display control device of the present invention.

When a garage-parking shifting operation of the shift lever 72 is performed to shift the automatic transmission 24 while the vehicle 10 is held stationary with the vehicle running speed V being equal to or lower than zero (V≤0) and while the accelerator pedal 62 is placed in the non-operated position with the accelerator pedal operation amount Acc being equal to or smaller than zero (Acc≤0), there is a possibility that the actual engine speed RNe deviates from the target value TNe due to a variation of a load acting on the engine 20 during shifting actions of the automatic transmission 24, in spite of the feedback control of the engine torque Te by the idling speed control portion 33. When the automatic transmission 24 is placed in the neutral position N in which the input shaft 122 and the output shaft 124 are disconnected from each other, the turbine impeller 22t of the torque converter 22 is rotated with a rotary motion of the pump impeller 22p and the load of the engine 20 becomes relatively low. When the automatic transmission 24 is placed in the forward-drive position D and the reverse-drive position R of the shift lever 72 in which the automatic transmission 24 is placed in a power transmitting state, the turbine impeller 22t is brought into a stationary state while only the pump impeller 22p is kept rotated when the vehicle 10 is held stationary (V=0). As a result, the engine load is increased due to a resistance to stirring of an oil within the torque converter 22, so that the actual engine speed RNe varies in spite of the target engine speed TNe being kept constant, if the engine torque Te has a low degree of feedback control response. Described in detail, when the engine load is increased as a result of an operation of the shift lever 72 from the neutral position N to the forward-drive position D or the reverse-drive position R, the actual engine speed RNe may be temporarily lowered. When the engine load is reduced as a result of an operation of the shift lever 72 from the forward-drive position D or the reverse-drive position R to the neutral position N, on the other hand, the actual engine speed RNe may be temporarily raised. In this respect, it is noted that the shift lever 72 is once placed in the neutral position N when the shift lever 72 is operated between the forward-drive position D and reverse-drive position R, so that the engine load may temporarily vary, causing a variation of the actual engine speed RNe. If the display engine speed DNe temporarily varies with the variation of the actual engine speed RNe, in the absence of a depressing operation of the accelerator pedal 62, there is a possibility of causing the vehicle operator to feel uneasy about the variation of the display engine speed DNe.

In view of the possibility indicated above, the idling speed control portion 33 is configured to implement an idling speed variation restricting control for controlling the engine torque Te in synchronization with the shifting action of the automatic transmission 24 in consideration of the control response of the engine torque Te, so as to reduce an amount of deviation of the actual engine speed RNe from the target value TNe, in spite of a change of the engine load in the process of the shifting action of the automatic transmission 24 as a result of the garage-parking shifting operation of the shift lever 72. Namely, the idling speed control portion 33 increases or reduces the engine torque Te by a predetermined amount, at a suitable timing in the process of the shifting action of the automatic transmission 24, which timing permits reduction of the variation of the actual engine speed RNe in spite of the change of the engine load. The timings of increase and reduction of the engine torque Te, and the amounts of increase and reduction of the engine torque Te are determined by experimentations according to specific types of shifting of the automatic transmission 24 performed according to the respective different garage-parking shifting operation of the shift lever 72. Thus, the idling speed control portion 33 makes it possible to reduce the amounts of variation of the actual engine speed RNe and the display engine speed DNe, as a result of the garage-parking shifting operation of the shift lever 72.

However, a conventional idling speed variation restricting control has difficulty to ensure stable and adequate restriction of the variation of the actual engine speed RNe, due to variations of the control responses of the engine torque Te and the shifting actions of the automatic transmission 24, and variations of the engine load, which variations are caused by changes or variations of the temperature of the cooling water of the engine 20 and the viscosity of the working fluid of the automatic transmission 24, and dragging torques of the clutches C and brakes B, for example. There is a possibility that the actual engine speed RNe considerably varies in spite of and even as a result of the idling speed variation restricting control, due to an inadequate timing of changing the engine torque Te or inadequate amounts of increase or reduction of the engine torque Te, immediately after starting of the engine 20 at which the temperatures of the engine cooling water and the automatic transmission working fluid are low and the engine torque Te is unstable.

The engine speed display control portion 36 includes a variation restricting display control portion 38 configured to restrict an amount of variation of the display engine speed DNe, irrespective of a variation of the actual engine speed RNe during the garage-parking shifting operation of the shift lever 72. This variation restricting display control portion 38 includes a variation restricting display control determining portion 40 and a variation restricting portion 42. The variation restricting display control portion 38 is configured to implement steps S1-S5 of a control routine illustrated in the flow chart of FIG. 6 and steps G1-1 through G1-7 of a control routine illustrated in the flow chart of FIG. 7. A portion of the engine speed display control portion 36 to implement the control routine of FIG. 6 (steps S1-S5) functions as the variation restricting display control determining portion 40, while a portion of the engine speed display control portion 36 to implement the control routine of FIG. 7 (steps G1-1 through G1-7) functions as the variation restricting portion 42.

Figure 6:
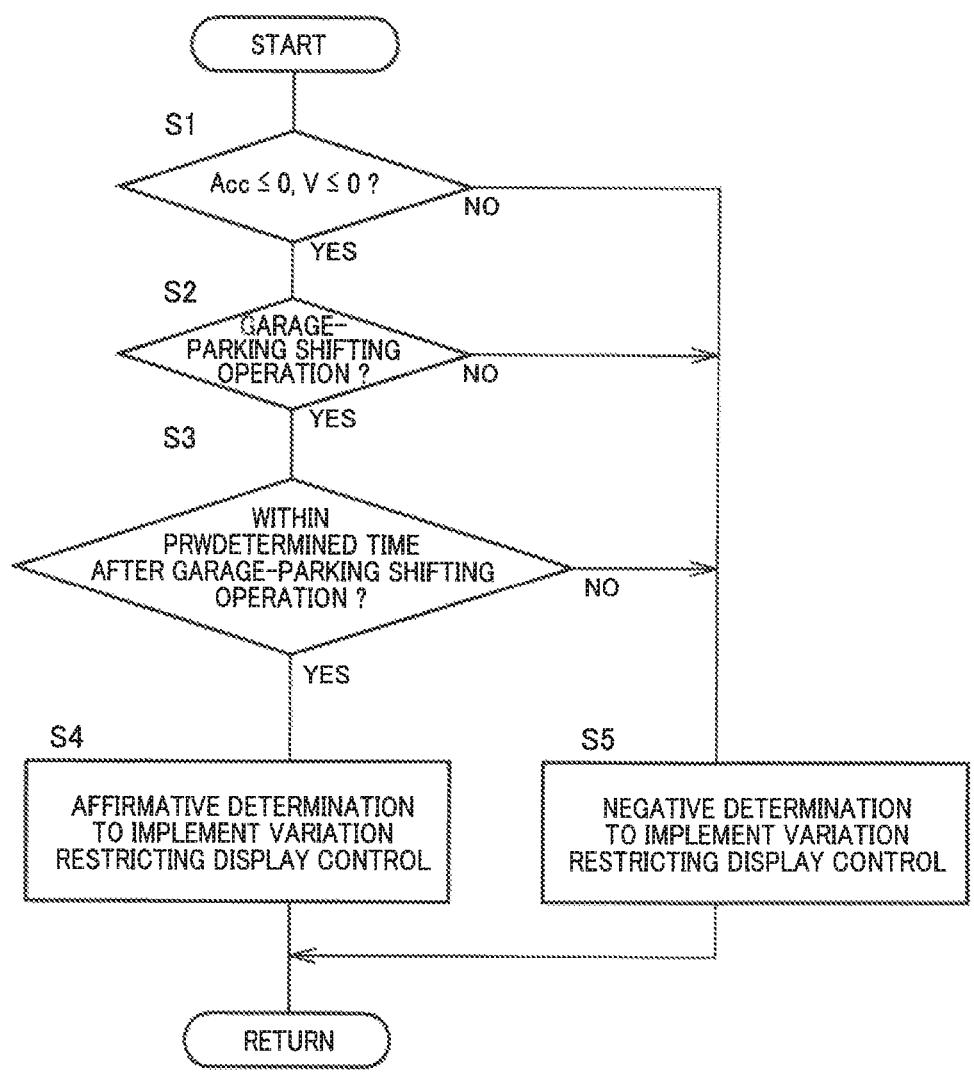
FIG. 6 is a flow chart illustrating an operation of a garage-parking shifting control determining portion of FIG. 1 according to a first embodiment of this invention.

The control routine of FIG. 6 implemented by the variation restricting display control determining portion 40 is initiated with the step S1, to determine whether the accelerator pedal operation amount Acc is equal to or smaller than zero (Acc≤0) while the vehicle running speed V is equal to or lower than zero (V≤0), that is, whether the accelerator pedal 62 is placed in the non-operated position while the vehicle 10 is held stationary. If the accelerator pedal 62 is placed in the non-operated position while the vehicle 10 is held stationary, the control flow goes to the step S2 and the subsequent steps. If the accelerator pedal 62 is operated with the operation amount Acc being larger than zero, or if the vehicle 10 is running with the running speed V being higher than zero, the control flow goes to the step S5 to make a negative determination to implement a variation restricting display control in response to the garage-parking shifting operation of the shift lever 72. This negative determination to be made in the step S5 indicates the state of the vehicle 10 which does not require the variation restricting display control to restrict the variation of the display engine speed DNe according to the variation of the actual engine speed RNe, namely, the state of the vehicle 10 which permits the normal display control to determine the display engine speed DNe according to the actual engine speed RNe. It is noted that the step S1 corresponds to a function of a vehicle state determining portion. The accelerator pedal operation amount Acc used to determine whether the accelerator pedal 62 is placed in the non-operated position may be replaced by any other parameter such as an angle of opening of an electronic throttle valve which is controlled according to the accelerator pedal operation amount Acc.

The step S2 is implemented to determine whether the garage-parking shifting operation of the shift lever 72 has been performed to shift the automatic transmission 24, more specifically, to determine whether the shift lever 72 has been operated from the neutral position N to the forward-drive position D or the reverse-drive position R, or from the forward-drive position D or the reverse-drive position R to the neutral position N, or alternatively, between the forward-drive and reverse-drive positions D and R. If an affirmative determination is obtained in the step S2, the control flow goes to the step S3. If a negative determination is obtained in the step S2, on the other hand, the control flow goes to the step S5 to make the negative determination of the garage-parking shifting operation of the shift lever 72. It is noted that the step S2 corresponds to a function of a garage-parking shifting operation determining portion. Where the shift lever 72 has a parking position P for parking the vehicle 10, the automatic transmission 24 is placed in its neutral position N when the shift lever 72 is placed in the parking position P. In this sense, the parking position P can be considered to be equivalent to the neutral position N, regarding the determination as to whether the garage-parking shifting operation of the shift lever 72 has been performed.

The step S3 is implemented to determine whether a length of time after a moment of the affirmative determination in the step S2 that the garage-parking shifting operation of the shift lever 72 has been performed is within a predetermined time. This predetermined time is a variation restricting time Tgr during which the variation restricting display control is implemented. The variation restricting time Tgr, which is preferably determined to be as short as possible, includes at least a time length during which the actual engine speed RNe may vary in accordance with shifting of the automatic transmission 24 due to the garage-parking shifting action. For example, the variation restricting time Tgr (predetermined length of time) is determined so as to change according to the kind of the garage-parking shifting operation of the shift lever 72, the state of the vehicle 10 such as the cooling water temperature of the engine 20, and the working fluid temperature of the automatic transmission 24. If an affirmative determination is obtained in the step S3, that is, if the predetermined variation restricting time Tgr has not passed after the moment of the affirmative determination in the step S2, there is a possibility that the actual engine speed RNe varies during a shifting action or actions of the automatic transmission 24 as a result of the garage-parking shifting operation of the shift lever 72. In this case, the control flow goes to the step S4 to make an affirmative determination to implement the variation restricting display control for restricting a variation of the display engine speed DNe in spite of a variation of the actual engine speed RNe. If a negative determination is obtained in the step S3, that is, if the predetermined variation restricting time Tgr has passed, it is not necessary to implement the variation restricting display control to restrict the variation of the display engine speed DNe. In this case, the control flow goes to the step S5 to make the negative determination to implement the variation restricting display control.

Figure 7:
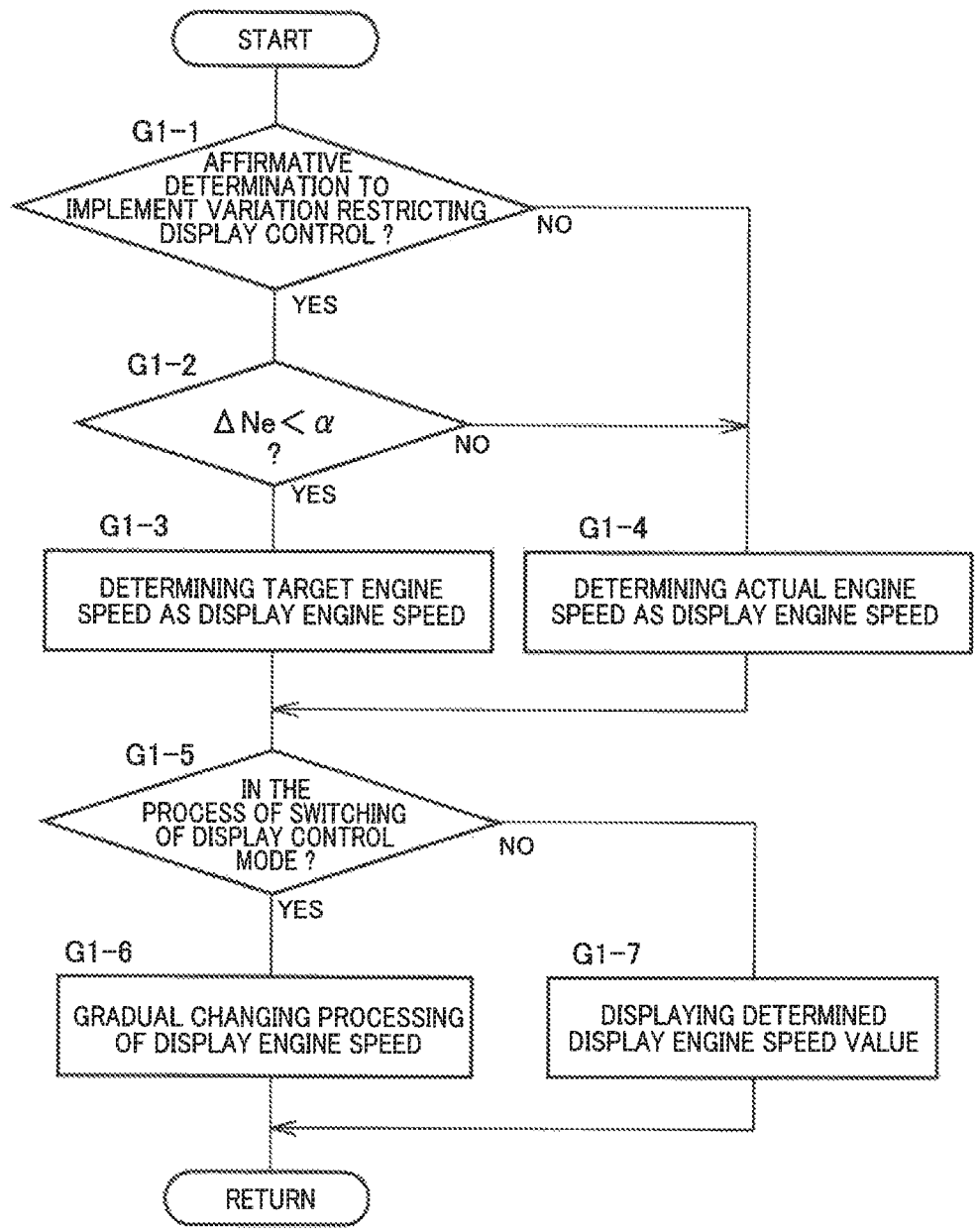
FIG. 7 is a flow chart illustrating an operation of a variation restricting portion shown in FIG. 1, according to the first embodiment of this invention.

The control routine of FIG. 7 implemented by the variation restricting portion 42 is initiated with the step G1-1 to determine whether the affirmative determination to implement the variation restricting display control has been made. If an affirmative determination is obtained in the step G1-1, the control flow goes to the step G1-2. If a negative determination is obtained in the step G1-1, on the other hand, the control flow goes to the step G1-4. When the negative determination is obtained in the step G1-1, it is not necessary to implement the variation restricting display control to restrict the variation of the display engine speed DNe. In this case, the step G1-4 is implemented to implement the normal display control in which the actual engine speed RNe is determined as the display engine speed DNe.

In the step G1-2 implemented if the affirmative determination is obtained in the step G1-1, a determination is made as to whether an absolute value of a speed difference ΔNe between the actual engine speed RNe and the target value TNe is smaller than a predetermined threshold value α. If the speed difference ΔNe is smaller than the threshold value α, the control flow goes to the step G1-3 to determine the target value TNe as the display engine speed DNe, namely, to implement the variation restricting display control in which the variation of the display engine speed DNe is restricted in spite of the variation of the actual engine speed RNe, that is, the display engine speed DNe is determined by the target engine speed TNe.

If a negative determination is obtained in the step G1-2, that is, if the speed difference ΔNe is not smaller than the threshold value α, the control flow goes to the step G1-4 to determine the actual engine speed RNe as the display engine speed DNe. Namely, if the speed difference ΔNe is relatively large, the restriction of the variation of the display engine speed DNe gives rise to a possibility that the vehicle operator feels uneasy about the display engine speed DNe the variation of which is restricted, since the vehicle operator feels a large difference of the display engine speed DNe from an engine speed value estimated by the vehicle operator on the basis of an operating sound of the engine 20. Accordingly, when the speed difference ΔNe is not smaller than the threshold value α (ΔNe≥α), the step G1-4 is implemented to implement the normal display control in which the display engine speed DNe is determined according to the actual engine speed RNe such that the display engine speed DNe varies according to a variation of the actual engine speed RNe. The threshold value α may be a constant value, or a variable which is changed depending upon the state of the vehicle 10 such as the kind of the shifting action of the automatic transmission 24 in response to the garage-parking shifting operation of the shift lever 72. The speed difference ΔNe represents an amount of deviation of the actual engine speed RNe from the target value TNe.

The step G1-3 to determine the target engine speed TNe as the display engine speed DNe, and the step G1-4 to determine the actual engine speed RNe as the display engine speed DNe are followed by the step G1-5 to determine whether the variation restricting display control portion 38 is in the process of transition of the engine speed display control mode between the variation restricting display control to determine the target engine speed TNe as the display engine speed DNe, and the normal display control to determine the actual engine speed RNe as the display engine speed DNe. That is, a gradually changing processing is implemented in the step G1-6 as described below in detail, before the display control mode of the engine speed is switched between the variation restricting display control and the normal display control. Therefore, the step G1-5 is implemented to determine whether the gradually changing processing is being performed. If an affirmative determination is obtained in the step G1-5, the control flow goes to the step G1-6, so that the gradually changing processing is continued. The determination in the step G1-5 can be made by determining whether the determined display engine speed DNe is substantially equal to the actual engine speed RNe or the target engine speed TNe. In the gradually changing processing in the step G1-6, a rate of change of the display engine speed DNe is calculated on the basis of a difference between the display engine speed DNe and the actual engine speed RNe or the target engine speed TNe, at a predetermined time interval, and the display engine speed DNe is gradually changed at the calculated rate, so that the thus gradually changed display engine speed DNe is displayed on the tachometer 44. The time interval indicated above may be a constant value, or may be a variable depending upon whether the engine speed used to determine the display engine speed DNe is changed from the actual engine speed RNe to the target engine speed TNe, or from the target engine speed TNe to the actual engine speed RNe, or depending upon the kind of the garage-parking shifting operation of the shift lever 72. The display engine speed DNe may be gradually changed at a predetermined constant rate.

If a negative determination is obtained in the step G1-5, that is, if the gradually changing processing in the step S1-6 has been terminated, namely, if the variation restricting display control portion 38 is not in the process of transition of the engine speed display control mode, the control flow goes to the step G1-7 in which the display engine speed DNe determined on the basis of the target engine speed TNe or the actual engine speed RNe is displayed. The display engine speed DNe to be displayed on the tachometer 44 may be the target engine speed TNe or the actual engine speed RNe, or a value obtained as a result of smoothing of the target or actual engine speed TNe or RNe.

FIGS. 8-11 are the time charts indicating examples of changes of operating states of various portions of the vehicle 10 when the garage-parking shifting operation is implemented and the variation restricting display control of the display engine speed DNe is implemented along the flow charts of FIGS. 6 and 7. In the examples of FIGS. 8-11, the engine 20 is started with an operation of an ignition switch, at a point of time t1, and the garage-parking shifting operation of the shift lever 72 from the neutral position N to the forward-drive position D or reverse-drive position R is performed at a point of time t2 later than the point of time t1. A flag indicative of "DETERMINATION OF DEVIATION" in FIGS. 8-11 is turned ON when ΔNe≥α, and turned OFF when ΔNe<α. "RNe" of "DISPLAY ENGINE SPEED" indicates the normal display control in which the actual engine speed RNe is determined as the display engine speed DNe, while "TNe" indicates the variation restricting display control in which the target engine speed TNe is determined as the display engine speed DNe. Regarding "SPEEDS", the display engine speed DNe, the actual engine speed RNe, the turbine speed Nt and the target engine speed TNe are respectively represented by a thick solid line, a thin solid line, a one-dot chain line and a broken line. The display engine speed DNe is held equal to the actual engine speed RNe or the target engine speed TNe, except for a time period "ON" of the gradually changing processing of the display engine speed DNe.

Figure 8:
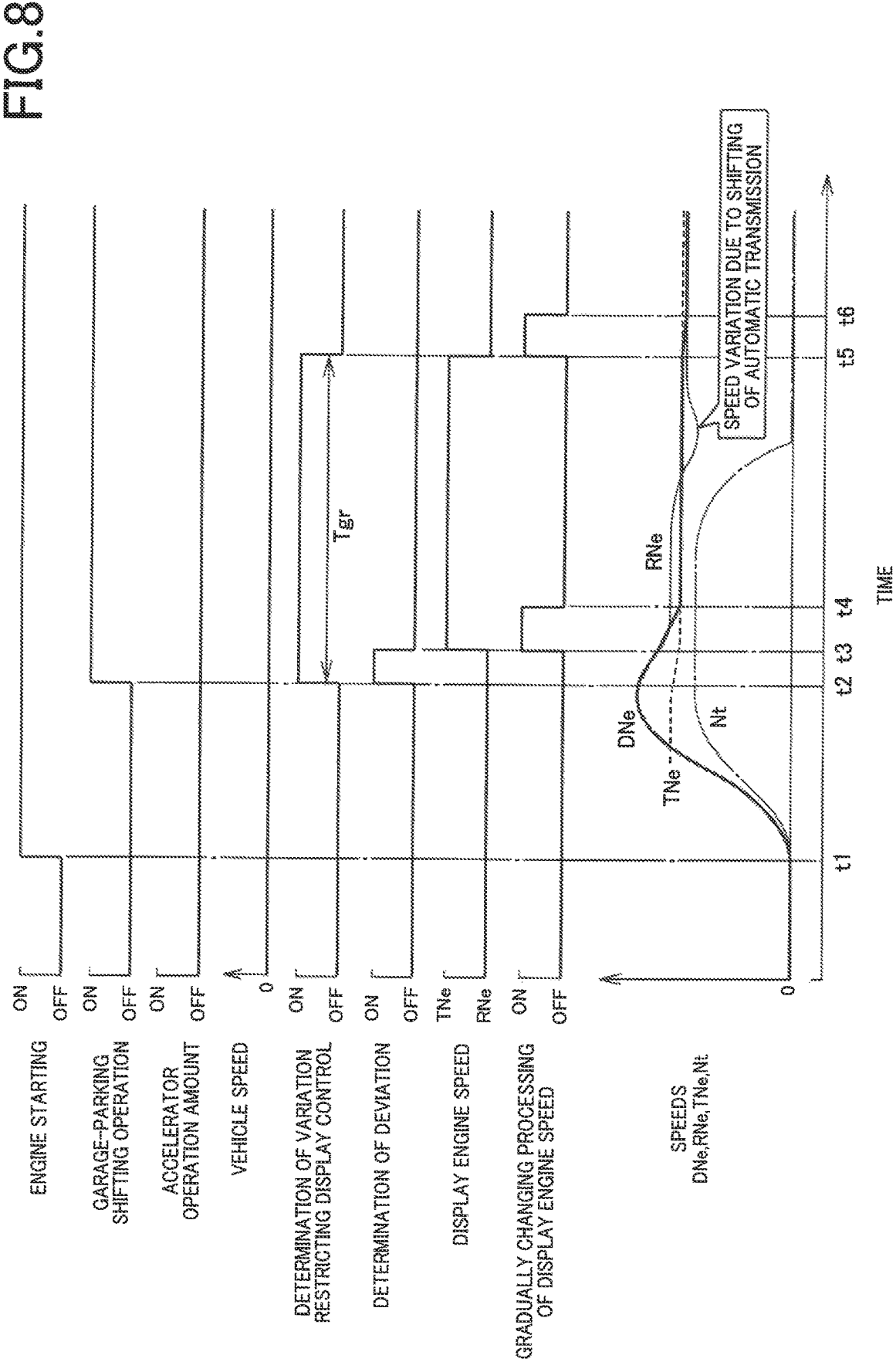
FIG. 8 is a time chart indicating an example of changes of operating states of various portions of the vehicle when a variation restricting display control of a display engine speed is implemented by a speed variation restricting display control portion shown in FIG. 1.

In the example of FIG. 8, the garage-parking shifting operation of the shift lever 72 is performed a comparatively short time after starting of the engine 20 at the point of time t1. At the point of time t2 at which the garage-parking shifting operation is performed, the speed difference ΔNe between the actual engine speed RNe and the target engine speed TNe is equal to or larger than the threshold value α, so that the negative determination is obtained in the step G1-2. Accordingly, the actual engine speed RNe is displayed as the display engine speed DNe, immediately after the moment of the garage-parking shifting operation (immediately after the point of time t2). At a point of time t3, the speed difference ΔNe has been reduced below than the threshold value α, as a result of reduction of the actual engine speed RNe toward the target value TNe owing to a feedback control of the engine torque Te. As a result of reduction of the speed difference ΔNe below the threshold value α, the step G1-3 is implemented to determine the target engine speed TNe as the display engine speed DNe. Then, the steps G1-5 and G1-6 are implemented to gradually change the display engine speed DNe toward the target engine speed TNe. The gradually changing processing is terminated at a point of time t4 at which the display engine speed DNe coincides with the target engine speed TNe.

At a point of time t5 in FIG. 8, the predetermined variation restricting time Tgr has expired after the moment of the garage-parking shifting operation, and a flag indicative of "DETERMINATION OF VARIATION RESTRICTING DISPLAY CONTROL" is turned OFF. As a result, the step G1-1 is followed by the step G1-4 to return the display control mode from the variation restricting display control to determine the target engine speed TNe as the display engine speed DNe, to the normal display control to determine the actual engine speed RNe as the display engine speed DNe. In this case, too, the gradually changing processing is implemented to gradually change the display engine speed DNe to be on the basis of the actual engine speed RNe. The gradually changing processing to gradually change the display engine speed DNe on the basis of the actual engine speed RNe is terminated at a point of time t6.

It is noted here that the actual engine speed RNe is temporarily lowered during a time period between the points of time t4 and t5 during which a shifting action of the automatic transmission 24 takes place in response to the garage-parking shifting operation of the shift lever 72. During this time period, the target engine speed TNe is displayed as the display engine speed DNe on the tachometer 44. Thus, the display engine speed DNe is held substantially constant in spite of a drop of the actual engine speed RNe, so that there is a low possibility that the vehicle operator feels uneasy about the display engine speed DNe displayed on the tachometer 44. The above-indicated drop of the actual engine speed RNe is considered to take place due to an inadequate timing of control and inadequate amounts of change of the engine torque Te, in spite of the idling speed variation restricting control implemented by the idling speed control portion 33, since the idling speed variation restricting control is implemented immediately after starting of the engine 20, that is, while the temperatures of the cooling water of the engine 20 and the working fluid of the automatic transmission 24 are still low, and while the engine torque Te is unstable.

Figure 9:
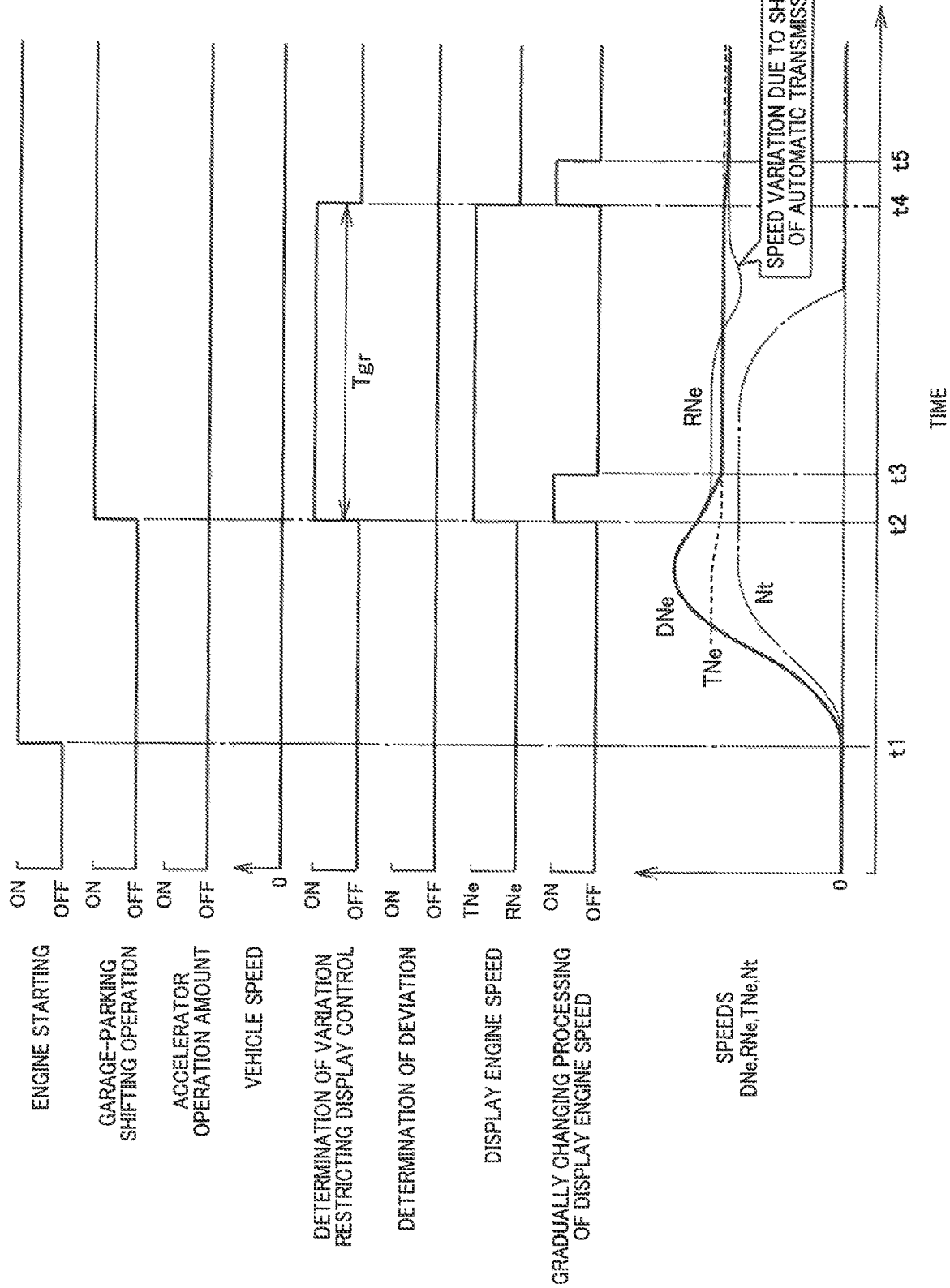
FIG. 9 is a time chart indicating an example of changes of the operating states when a garage-parking shifting operation of a shift lever is performed after starting of an engine, at a timing later than that of FIG. 8.
Figure 10:
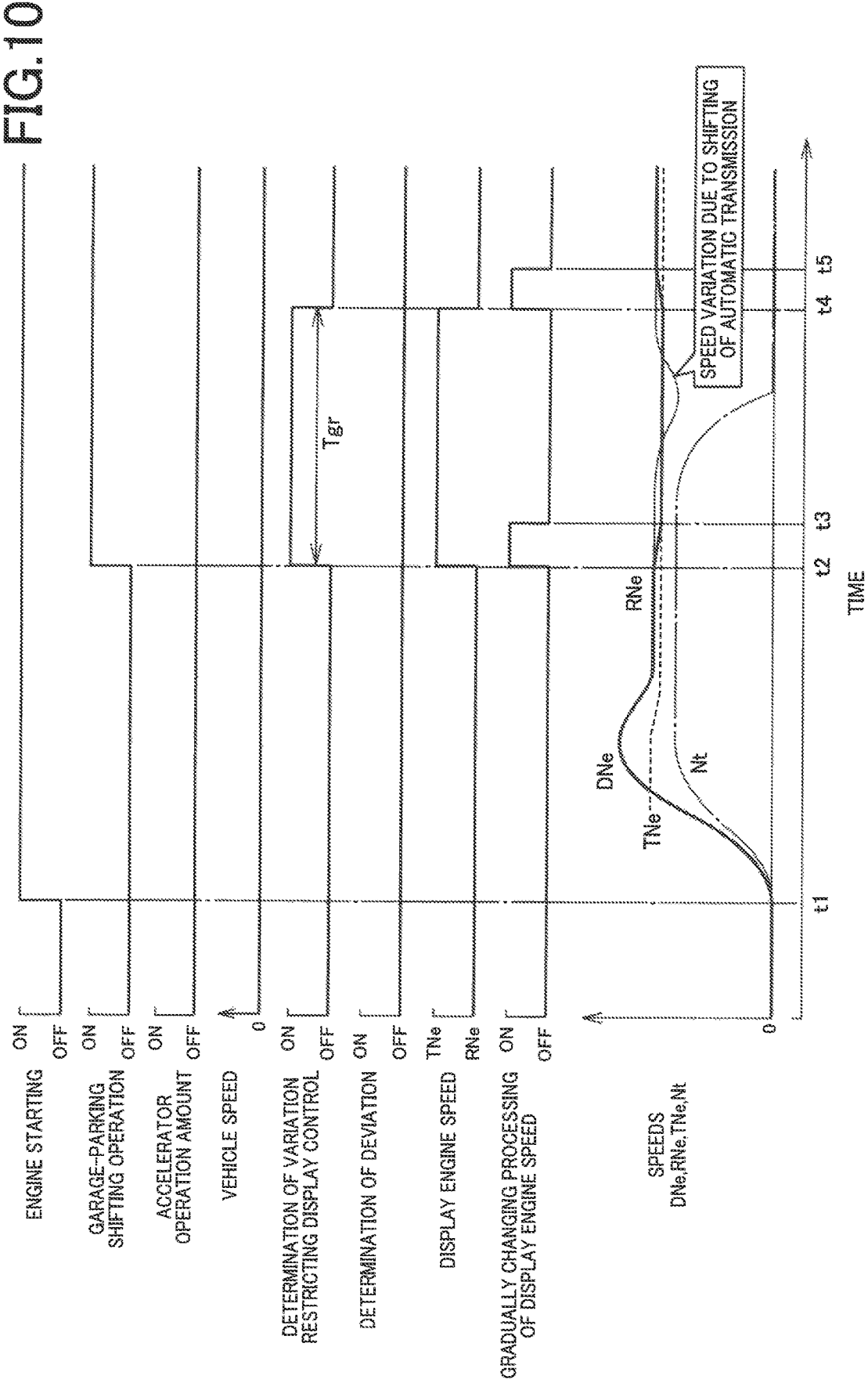
FIG. 10 is a time chart indicating an example of changes of the operating states when the garage-parking shifting operation is performed after starting of the engine, at a timing later than that of FIG. 9.

In the example of FIG. 9, the garage-parking shifting operation of the shift lever 72 is performed at a later timing (point of time t2) than in the example of FIG. 8, and the speed difference ΔNe between the actual engine speed RNe and the target engine speed TNe is smaller than the threshold value α. In this case, the target engine speed TNe is immediately determined as the display engine speed DNe, and the target engine speed TNe is displayed as the display engine speed DNe on the tachometer 44, after the gradually changing processing during the time period between the points of time t2 and t3. In the example of FIG. 10, the garage-parking shifting operation is performed at a later timing (point of time t2) than in the example of FIG. 9, after the actual engine speed RNe has become substantially equal to the target engine speed TNe. This example of FIG. 10 has substantially the same operational effect as the example of FIG. 9.

In the example of FIG. 11, the garage-parking shifting operation is performed at substantially the same timing as in the example of FIG. 10, but the actual engine speed RNe is abruptly raised during the variation restricting time Tgr (between the points of time t2 and t6), so that the speed difference ΔNe between the actual engine speed RNe and the target engine speed TNe has reached to the threshold value α at the point of time t4. This change of the actual engine speed RNe is also considered to take place due to an inadequate timing of control of the engine torque Te, for example, in spite of the idling speed variation restricting control implemented by the idling speed control portion 33, immediately after starting of the engine 20, that is, while the temperatures of the engine cooling water and automatic transmission working fluid are still low, and while the engine torque Te is unstable. In this case, the display control mode is returned even during the variation restricting time Tgr, from the variation restricting display control to determine the target engine speed TNe as the display engine speed DNe, to the normal display control to determine the actual engine speed RNe as the display engine speed DNe, and the display engine speed DNe is gradually changed on the basis of the actual engine speed RNe during the time period between the points of time t4 and t5.

The engine speed display control portion 36 to display the operating speed of the engine 20 according to the present embodiment of the invention is configured to switch the engine speed display control mode from the normal display control to determine the display engine speed DNe according to the actual engine speed RNe, to the variation restricting display control to determine the display engine speed DNe according to the target engine speed TNe, when the garage-parking shifting operation of the shift lever 72 is performed. Accordingly, an amount of variation of the display engine speed DNe to be displayed on the tachometer 44 is reduced. Thus, the present engine speed display control portion 36 is configured to restrict the variation of the display engine speed DNe, so that the vehicle operator is less likely to feel uneasy about the display engine speed DNe, even when the actual engine speed RNe varies, during a shifting action of the automatic transmission 24 in response to the garage-parking shifting operation of the shift lever 72, due to an inadequate timing of control and inadequate amounts of change of the engine torque Te, for example, in spite of the idling speed variation restricting control implemented by the idling speed control portion 33, immediately after starting of the engine 20, that is, while the engine cooling water and transmission working fluid temperatures are still low, and while the engine torque Te is unstable.

The present embodiment is further configured such that the variation restricting display control portion 38 gradually changes the display engine speed DNe during the period of transition between the normal display control to determine the actual engine speed RNe as the display engine speed DNe, and the variation restricting display control to determine the target engine speed TNe as the display engine speed DNe. Accordingly, the vehicle operator is less likely to feel uneasy about the variation of the display engine speed DNe which is reduced during the period of transition between the normal and variation restricting display controls.

The present embodiment is also configured such that the variation restricting display control portion 38 does not implement the variation restricting display control to restrict the variation of the display engine speed DNe, and implements the normal display control to determine the display engine speed DNe according to the actual engine speed RNe, during the time period between the points of time t4 and t6, as indicated in FIG. 11, while the speed difference ΔNe between actual engine speed RNe and the target engine speed TNe is equal to or larger than the predetermined threshold value α. Although the vehicle operator would feel uneasy about the difference of the display engine speed DNe from the engine value estimated by the vehicle operator on the basis of the operating sound of the engine 20, the variation restricting display control portion 38 is configured to implement the normal display control to change the display engine speed DNe according to the variation of the actual engine speed RNe, so that the vehicle operator is less likely to feel uneasy about the difference of the display engine speed DNe from the engine speed value estimated by the vehicle operator on the basis of the operating sound of the engine 20.

The present embodiment is further configured such that the variation restricting display control portion 38 implements the variation restricting display control to determine the display engine speed DNe according to the target engine speed TNe so as to restrict the variation of the display engine speed DNe during only the predetermined variation restricting time Tgr during which there is a possibility of variation of the actual engine speed RNe due to the garage-parking shifting operation of the shift lever 72. The variation restricting display control portion 38 switches the display control mode from the variation restricting display control to the normal display control when the variation restricting time Tgr has passed. Accordingly, the variation restricting display control portion 38 makes it possible to reduce the possibility of the vehicle operator feeling uneasy by reducing the variation of the display engine speed DNe, while minimizing a time period during which the display engine speed DNe deviating from the actual engine speed RNe is displayed on the tachometer 44.

It is noted that the idling speed control portion 33 in the present embodiment is configured to implement the idling speed variation restricting control for controlling the engine torque Te in synchronization with the shifting action of the automatic transmission 24 in consideration of the control response of the engine torque Te, so as to reduce the amount of deviation of the actual engine speed RNe from the target value TNe, in spite of a change of the engine load in the process of the shifting action of the automatic transmission 24 as a result of the garage-parking shifting operation of the shift lever 72. However, the idling speed control portion 33 may be configured to simply feedback-control the engine torque Te such that the actual engine speed RNe coincides with the target value TNe. In this case, too, the variation restricting display control by the variation restricting display control portion 38 is effective. Where the garage-parking shifting operation of the shift lever 72 from the neutral position N to the forward-drive or reverse-drive position D or R is performed, for instance, the load acting on the engine 20 increases during a shifting action of the automatic transmission 24, and the actual engine speed RNe temporarily varies (drops) as indicated in the time charts of FIGS. 8-10 by way of example, so that there is a possibility that the vehicle operator feels uneasy about the variation of the display engine speed DNe according to the variation of the actual engine speed RNe. However, the variation of the display engine speed DNe can be reduced by the variation restricting display control implemented by the variation restricting display control portion 38 to determine the display engine speed DNe according to the target engine speed TNe, whereby the vehicle operator is less likely to feel uneasy about the display engine speed DNe displayed on the tachometer 44.

The present embodiment is also configured to switch the display control mode from the normal display control to determine the display engine speed DNe according to the actual engine speed RNe, to the variation restricting display control to determine the display engine speed DNe according to the target engine speed TNe, so that the amount of variation of the display engine speed DNe to be displayed on the tachometer 44 is reduced. However, it is possible to reduce the amount of variation of the display engine speed DNe, by selecting a high degree of smoothing of the actual engine speed RNe to determine the display engine speed RNe, as shown in the flow chart of FIG. 12 according to a second embodiment of this invention. A control routine illustrated in the flow chart of FIG. 12 is implemented in place of the control routine illustrated in the flow chart of FIG. 7 according to the first embodiment. Steps G2-1 and G2-2 in the control routine of FIG. 12 are identical with the steps G1-1 and G1-2 in the control routine of FIG. 7. Namely, the step G2-1 is implemented to determine whether the affirmative determination to implement the variation restricting display control has been made. If an affirmative determination is obtained in the step G2-1, the control flow goes to the step G2-2. If a negative determination is obtained in the step G2-1, on the other hand, the control flow goes to a step G2-4. When the negative determination is obtained in the step G2-1, it is not necessary to implement the variation restricting display control to restrict the variation of the display engine speed DNe. In this case, the step G2-4 is implemented to implement the normal display control in which the display engine speed DNe is determined according to the actual engine speed RNe, more specifically, by smoothing the actual engine speed RNe. In this step G2-4, a low degree of smoothing of the actual engine speed RNe is selected to calculate the display engine speed DNe, so that a rate and an amount of variation of the calculated or determined display engine speed DNe are relatively close to those of the actual engine speed RNe. The degree of smoothing in the step S2-4 may be zero, so that the actual engine speed RNe is displayed as the display engine speed DNe on the tachometer 44.

In the step G2-2 implemented if the affirmative determination is obtained in the step G2-1, a determination is made as to whether the absolute value of the speed difference ΔNe between the actual engine speed RNe and the target value TNe is smaller than the predetermined threshold value α. If the speed difference ΔNe is smaller than the threshold value α, the control flow goes to a step G2-3. Namely, if the speed difference ΔNe is smaller than the threshold value α after the garage-parking shifting operation of the shift lever 72 has been performed, the step G2-3 is implemented to implement the variation restricting display control in which a higher degree of smoothing of the actual engine speed RNe than in the normal display control in the step G2-4 is selected to calculate the display engine speed DNe, and the thus calculated display engine speed DNe is displayed on the tachometer 44. The higher degree of smoothing of the actual engine speed RNe to calculate the display engine speed DNe permits a lower rate of variation and a smaller amount of variation of the display engine speed DNe, than in the normal display control in which the lower degree of smoothing is selected. Accordingly, the vehicle operator is less likely to feel uneasy about the variation of the display engine speed DNe.

While the preferred embodiments and modifications have been described for illustrative purpose only, it is to be understood that the present invention may be embodied with various other changes and improvements, which may occur to those skilled in the art.

NOMENCLATURE OF ELEMENTS

10: vehicle
12: vehicular drive system
20: engine
22: torque converter (fluid-operated power transmitting device)
24: automatic transmission
30: electronic control device
33: idling speed control portion
36: engine speed display control portion (engine speed display control device)
38: variation restricting display control portion
44: tachometer (engine speed display)
64: engine speed sensor
72: shift lever (manually operated transmission shifting member)
RNe: actual engine speed
TNe: target engine speed
DNe: display engine speed
ΔNe: speed difference (amount of speed deviation)
α: threshold value
Tgr: variation restricting time

What is claimed is:

1. An engine speed display control device of a vehicle including: a vehicular drive system including an engine, a fluid-operated power transmitting device, and an automatic transmission having a plurality of operating positions having respective different states of transmission of power therethrough; a manually operated transmission shifting member operated by an operator of the vehicle to place the automatic transmission in a selected one of the operating positions; an accelerator pedal; an engine speed sensor to detect an actual value of an operating speed of the engine; and an engine speed display to display a determined display value of the operating speed of the engine, the engine speed display control device being configured to determine the display value of the operating speed of the engine to be displayed by the engine speed display, and comprising:

a variation restricting display control portion configured to implement a variation restricting display control when a garage-parking shifting operation of the manually operated transmission shifting member is performed while the vehicle is held stationary and while the accelerator pedal is placed in a non-operated position, the variation restricting display control portion determining the display value of the operating speed of the engine in the variation restricting display control such that an amount of variation of the display value is smaller than in a normal display control in which the display value is determined according to the actual value.

2. The engine speed display control device according to claim 1, wherein the variation restricting display control portion determines the display value of the operating speed of the engine according to a target value of the operating speed used in place of the actual value, in the variation restricting display control.

3. The engine speed display control device according to claim 2, wherein the variation restricting display control portion gradually changes the display value of the operating speed of the engine, during a period of transition between the normal display control and the variation restricting display control.

4. The engine speed display control device according to claim 1, wherein the variation restricting display control portion selects a higher degree of smoothing of the actual value of the operating speed of the engine to reduce an amount of variation of the display value in the variation restricting display control, than in the normal display control.

5. The engine speed display control device according to claim 1, wherein the variation restricting display control portion does not implement the variation restricting display control to restrict the variation of the display value of the operating speed of the engine, when an amount of deviation of the actual value of the operating speed of the engine from a target value of the operating speed is equal to or larger than a predetermined threshold value.

6. The engine speed display control device according to claim 1, wherein the variation restricting display control portion switches a display control mode from the variation restricting display control to restrict the variation of the display value of the operating speed of the engine, to the normal display control, when a predetermined variation restricting time has passed after a moment of the garage-parking shifting operation of the manually operated transmission shifting member is performed.

7. The engine speed display control device according to claim 1, wherein the vehicle further includes an idling speed control portion configured to implement an idling speed variation restricting control to control a torque of the engine in synchronization with a shifting action of the automatic transmission in response to the garage-parking shifting operation of the manually operated transmission shifting member, and in consideration of a control response of the torque of the engine, so as to reduce an amount of deviation of the actual value of the operating speed of the engine from a target value of the operating speed during the shifting action of the automatic transmission.

* * * * *